| United States Patent [19] | [11] Patent Number: 4,999,177 |
| Chen et al. | [45] Date of Patent: Mar. 12, 1991 |

[54] PROCESS FOR THE PREPARATION OF HIGH PURITY CARBON MONOXIDE

[75] Inventors: Shien-Chang Chen, Taiwan; Wan-Jy Cheng, Kaohsiung; Fu-Shen Lin, Kaohsiung; Fu-Juh Huang, Kaohsiung, all of Taiwan

[73] Assignee: Dairen Chemical Corporation, Taipei, Taiwan

[21] Appl. No.: 335,234

[22] Filed: Apr. 10, 1989

[51] Int. Cl.$^5$ .............................................. C01B 31/18
[52] U.S. Cl. ................................ 423/415 A; 502/325; 502/339; 568/876
[58] Field of Search ................ 423/415 A; 568/876; 502/325, 339

[56] References Cited

U.S. PATENT DOCUMENTS

| 3,692,849 | 9/1972 | Fenton | 568/876 |
| 3,721,714 | 3/1973 | Fenton | 568/876 |
| 3,812,210 | 5/1974 | Higdon et al. | 568/876 |
| 3,836,583 | 9/1974 | Matthias et al. | 423/415 A |
| 3,985,814 | 10/1976 | Dougherty | 568/876 |
| 4,474,744 | 10/1984 | Green | 423/415 A |
| 4,661,623 | 4/1987 | Chang et al. | 560/232 |
| 4,661,624 | 4/1987 | Chang et al. | 560/232 |

FOREIGN PATENT DOCUMENTS

| 52-36609 | 3/1977 | Japan | 568/876 |
| 61-141608 | 6/1986 | Japan | 423/415 A |
| 2058733 | 4/1981 | United Kingdom | 423/415 A |

*Primary Examiner*—Olik Chaudhuri
*Assistant Examiner*—Robert M. Kunemund

[57] ABSTRACT

A process is disclosed for the preparation of high purity carbon monoxide by heating methyl formate in the presence of a catalyst of a precious metal compound with or without a promoter of alkali or alkaline earth metal compound.

1 Claim, No Drawings

PROCESS FOR THE PREPARATION OF HIGH PURITY CARBON MONOXIDE

BACKGROUND OF THE INVENTION

1. Field of the invention

The present invention related to a process for the preparation of high purity carbon monoxide by the decarbonylation of methyl formate.

The conventional process for producing high purity carbon monoxide comprises cracking methanol or the partial oxidation of LPG and naphtha to obtain a mixture of carbon monoxide and hydrogen, which has to be purified through the cryogenic separation or selective adsorption processes. Also known is the partial oxidation of petroleum coke and residual oil.

These conventional processes require complicated equipment and facilities, and have high capital costs. Now high purity carbon monoxide can be easily obtained directly from the catalytic decarbonylation of methyl formate without any purification equipment.

2. Description of the prior arts

The well known prior art process of pyrolysis of methyl formate involves (a) a process wherein a mixture of methyl formate and methanol are pyrolyzed at a temperature of 200°-500° C. in the presence of a catalyst comprising an alkali metal compound (U.S. Pat. No. 4,303,630); (Japan Patent JP56-32,315;JP56-125,212); (b) a process wherein methyl formate is pyrolyzed at a temperature of 50°-200° C. in the presence of a catalyst comprising an amidine or a base and epoxide (U.S. Pat. No. 4,474,744); (c) a process wherein methyl formate is pyrolyzed at a temperature of 200°-550° C. in the presence of active carbon (Japan laid-open Patent 52-36609).

Among the above mentioned processes, process (a) stipulates that the concentration of methyl formate be limited to 10-70 wt %. If the concentration is less than 10 wt %, the yield of carbon monoxide will be decreased. On the other hand, if the concentration is higher than 70 wt %, the amount of hydrogen evolved will be larger and the purity of the carbon monoxide will be decreased. Therefore this process can not produce carbon monoxide of high purity when the methyl formate concentration is higher than 70 wt %.

The process (b) stipulates that the reaction be carried out in a liquid phase, thus requiring an additional catalyst recovery step.

In the case of process (c), a large amount of hydrogen is also produced, thus making it impossible to obtain carbon monoxide of high purity.

SUMMARY OF THE INVENTION

A new process is here disclosed for the preparation of high purity carbon monoxide by heating methyl formate in the presence of a catalyst of a precious metal compound with or without a promoter of alkali or alkaline earth metal compound, under reaction at a temperature of 190° to 290° C.

The object of the present invention is to provide a simple process for the production of high purity carbon monoxide, a high conversion of methyl formate, and a long life after catalyst.

The catalyst of the present invention makes a selective pyrolysis of methyl formate into carbon monoxide and methanol without the decomposition of methanol into carbon monoxide and hydrogen being possible, therefore the purity of carbon monoxide can be in excess of 99 mole%.

The catalyst of the present invention has a very high activity, with the conversion of methyl formate at more than 99 mole %, as well as an extremely low deactivation rate; therefore the present invention can have many industrial applications.

DESCRIPTION OF PREFERRED EMBODIMENTS

The catalyst system of the present invention is a catalyst of a precious metal compound with or without a promoter of alkali or alkaline earth metal compound, to be reacted in a vapor phase at a temperature of 190° to 290° C., and at any pressure.

The suitable precious metal compound catalysts are compounds of platinum, iridium, and ruthenium, typical examples including platinum chloride, platinum ammonium chloride, iridium chloride, iridium ammonium chloride, ruthenium tetroxide, ruthenium red (Ammoniated ruthenium oxychloride).

Our experiments show that a catalyst of a precious metal compound without any promoter is sufficient to prepare a high purity carbon monoxide in excess of 98.5 mole %, but with the usage of alkali or alkaline earth metal compound as the promoter, not only can the reaction temperature be further reduced but also the purity of the carbon monoxide can be increased.

Suitable promoters of alkali or alkaline earth metal compounds are compounds of sodium, potassium, calcium, and magnesium; typical compounds include sodium hydroxide, potassium hydroxide, calcium acetate, and magnesium oxide.

The catalysts and promoters may be carried by such carriers as aluminum oxide, silicon oxide, activated carbon, zirconium oxide, titanium dioxide, magnesium oxide, and calcium oxide.

No particular limitation exists in the concentration of catalysts and promoters supported on these carriers, but generally the concentration of catalyst and promoter are in the range of 0.02 to 5.0 wt %, preferably 0.1 to 3.0 wt %.

The reaction is carried out at a temperature of 190° to 290° C., preferably 210° to 270°.C., generally the lower the reaction temperature the lower the yield, the higher the reaction temperature the lower the purity of carbon monoxide.

The liquid hourly velocity is within the range of 1 to 30 $H^{-1}$, preferable 2 to 20 $H^{-1}$.

The reaction can be carried out in a fixed bed or fluidized bed reactor.

The present invention is further illustrated by the following examples. However, this invention should not be limited by these examples, and changes and modifications within the spirit and scope of this invention can be effected.

EXAMPLE 1

0.26 gram of platinum chloride ($H_2PtCl_6.6H_2O$)) was dissolved in 70 ml of deionized water. The resulting solution was transferred to a vessel provided with a rotation device. 100 grams of alumina SB-70 product of CONDEA W. Germany) were poured into the above vessel. The resulting mixture was rotated for one hour. The wet alumina was removed from the vessel and transferred to an oven whose temperature was maintained at 120° C. for 4 hours.

A reactor having an inside diameter of 23.5 mm was filled with 20 grams of the dried catalyst prepared by the above procedure.

The catalyst was reduced at a temperature of 200° C. under atmospheric pressure by introducing hydrogen gas continuously at a gas hourly velocity of 5000 hr$^{-1}$ for 8 hrs.

98 wt % methyl formate was then fed into the reactor at a liquid hourly velocity of 5.0 hr$^{-1}$ and maintained at a temperature of 220° C. under a pressure of 1.0 Kg/cm$^2$G. The test results are shown in table 1.

EXAMPLE 2

The preparation of a catalyst was carried out under the same conditions as described in example 1 except that 2.6 grams of platinum ammonium chloride were used in place of 0.26 grams of platinum chloride. The reaction was carried out under the same conditions as described in example 1. The test results are shown in table 1.

EXAMPLE 3

The preparation of a catalyst was carried out under the same conditions as described in example 1 except that 4.6 gram of iridium ammonium chloride were used in place of 0.26 gram of platinum chloride.

The reaction was carried out under the same conditions as described in example 1. The test results are shown in table 1.

EXAMPLE 4

The preparation of a catalyst was carried out under the same conditions as described in example 1 except that 1.0 gram of ruthenium tetroxide was used in place of 0.26 gram of platinum chloride, and Zirconium oxide was used in place of alumina.

The reaction was carried out under a temperature at 250° C., pressure at 5 Kg/cm$^2$G, and liquid hourly velocity of 10 hr$^{-1}$. The test results are shown in table 1.

EXAMPLE 5

0.26 grams of platinum chloride (H$_2$PtCl$_6$.6H$_2$O) and 1 gram of sodium hydroxide were dissolved in 70 ml of deionized water. The resulting solution was transferred to a vessel provided with a rotation device. 100 grams of alumina (SB-70, product of CONDEA W. Germany) was poured into the above vessel and rotated for one hour. The wet alumina was removed from the vessel and transferred to an oven where a temperature of 120° C. was maintained for 4 hours.

A reactor having an inside diameter of 23.5 mm was filled with 20 grams of the dried catalyst prepared by the above procedure.

The catalyst was reduced at a temperature of 200° C. under atmospheric pressure by introducing hydrogen gas continuously at an hourly velocity of 5000 hr$^{-1}$ for 8 hrs.

98 wt % methyl formate was then fed into the reactor at a liquid hourly velocity of 5.0 hr$^{-1}$ and maintained at a temperature of 150° C. under a pressure of 1.0 Kg/cm$^2$G. The test results are shown in table 1.

EXAMPLE 6-8

The preparation of a catalyst was carried out under the same conditions as described in example 1 except that the kind and content of precious metal was changed.

The reaction was carried out under the same conditions as described in example 1 except the pressure and temperature was changed. The test conditions and results are shown in table 1.

COMPARATIVE EXAMPLE 1

1 gram of sodium hydroxide was dissolved in 60 ml of deionized water. The resulting solution was transferred to a vessel provided with a rotation device. 100 grams of alumina /silica carrier (Al$_2$O$_3$/SiO$_2$=87/13, product of Nikki Co. Japan) were poured into the above vessel. The resulting mixture was rotated for one hour. The wet alumina / silica carrier was removed from the vessel and transferred to an oven whose temperature was maintained at 120° C. for 4 hours.

A reactor having an inside diameter of 23.5 mm was filled with 20 grams of the dried catalyst prepared by the above procedure. The reactor temperature was maintained at 270° C., under a pressure of 5.0 Kg/cm$^2$G. The reactor was fed with 98 wt % of methyl formate at a liquid hourly velocity of 5.0 hr$^{-1}$. The test results are shown in table 2.

COMPARATIVE EXAMPLE 2

3.3 grams of sodium palladium chloride (Na$_2$PdCl$_4$) were dissolved in 50 ml of deionized water. The resulting solution was transferred to a vessel provided with a rotation device. 100 grams of alumina (SB-70 product of CONDEA W. Germany) were poured into above vessel. The resulting mixture was rotated for one hour. The wet alumina was removed from the vessel and transferred to an oven whose temperature was maintained at 120° C. for 4 hours.

A reactor having an inner diameter of 23.5 mm was filled with 20 grams of the dried catalyst prepared by the above procedure. The reactor was maintained at 200° C., and the hydrogen gas was charged at a gas hourly velocity of 5000 hr$^{-1}$. The reduction reaction was continuously carried out at an atmospheric pressure for 8 hours, then the reactor temperature was maintained at 270° C. under a pressure of 5 Kg/cm$^2$G. The 98 wt % of methyl formate was continuously fed into the reactor at a liquid hourly velocity of 5.0 hr$^{-1}$. The test results are shown in table 2.

COMPARATIVE EXAMPLE 3

0.26 gram of platinum chloride (H$_2$PtCl$_6$.6H$_2$O) ) was dissolved in 60 ml of deionized water. The resulting solution was transferred to a vessel provided with a rotation device. 100 grams of alumina / silica carrier (Al$_2$O$_3$/SiO$_2$=72/28 product of Nikki Co. Japan) were poured into the above vessel. The resulting mixture was rotated for one hour. The carrier was removed and transferred to an oven whose temperature was maintained at 120° C. 4 hours.

The reaction was carried out under the same conditions as described in comparative example 2. The test conditions and results are shown in table 2.

The results of examples 1, 2, 3, 4, 8 shown in table 1, show that the process using a catalyst of a neutral or basic carrier result in higher selectivity and conversion.

The results of example 6 shown in table 1, show that the process carried out at a higher temperature, resulted in a higher conversion, but a lower selectivity of carbon monoxide.

The results of example 7 shown in table 1, show that the process carried out at a lower temperature, results in a lower conversion, but a higher selectivity of carbon monoxide.

The results of example 5 shown in table 1, show that the process using a catalyst containing a promoter of sodium hydroxide, results in a lower reaction temperature and a higher selectivity of carbon monoxide.

The results of comparative examples 1, 3 shown in table 2, show that the process using a catalyst of an acidic carrier, result in a lower selectivity of carbon monoxide.

The results of comparative example 2 shown in table 2, show that the process using a catalyst containing palladium, yields a low conversion.

We claim:

1. A process for preparing carbon monoxide of high purity in excess of 99 mole per cent by heating methyl formate under a reaction temperature of 150 to 350 degrees centigrade in the presence of a catalyst in an amount of 0.02 to 5 weight % supported on a neutral or basic carrier and a promoter of alkali or alkaline earth metal in a content of 0.1 to 10 weight %, based on a total weight of reactants charged, the improvement which comprises: said catalyst being a precious metal compound selected from platinum, iridium and ruthenium compound.

* * * * *

TABLE 1

| example | 1 | 2 | 3 | 4 | 5 | 6 | 7 | 8 |
|---|---|---|---|---|---|---|---|---|
| precious metal | 0.1% Pt | 1.0% Pt | 2.0% Ir | 0.6% Bu | 0.1% Pt | 0.02% Ir | 5% Ir | 1.5% Pt |
| promoter | — | — | — | — | 1.0% NaOH | — | — | — |
| carrier | Alumina | active carbon | Alumina | Zirconium dioxide | Alumina | Alumina | Zirconium dioxide | active carbon |
| liquid hourly space velocity $hr^{-1}$ | 5.0 | 5.0 | 5.0 | 10.0 | 5.0 | 5.0 | 5.0 | 5.0 |
| reaction temperature °C. | 220 | 220 | 220 | 250 | 150 | 280 | 180 | 200 |
| reaction pressure $kg/cm^2$ G | 1.0 | 1.0 | 1.0 | 5.0 | 1.0 | 5.0 | 1.0 | 1.0 |
| conversion % | 98.0 | 99.3 | 99.8 | 95.0 | 90.5 | 98.5 | 85.0 | 99.0 |
| gas composition | | | | | | | | |
| carbon monoxide vol % | 98.3 | 99.6 | 99.2 | 98.4 | 99.7 | 90.2 | 99.8 | 98.3 |
| carbon dioxide vol % | 0.2 | 0.1 | 0.2 | 0.2 | 0.1 | 0.6 | <0.1 | 0.2 |
| methane vol % | 0.1 | <0.1 | 0.1 | 0.1 | <0.1 | 0.4 | <0.1 | 0.1 |
| hydrogen vol % | 1.2 | 0.2 | 0.4 | 1.1 | 0.1 | 8.4 | 0.1 | 1.2 |

TABLE 2

| Comparative Example | 1 | 2 | 3 |
|---|---|---|---|
| Precious metal | 1% sodium hydroxide | 0.5% palladium | 0.1% platinum |
| carrier | Alumina/silica | Alumina | Alumina/silica |
| liquid hourly space velocity $hr^{-1}$ | 5.0 | 5.0 | 5.0 |
| reaction temperature °C., | 270 | 270 | 270 |
| reaction pressure $kg/cm^2$ G | 5.0 | 5.0 | 5.0 |
| conversion % | 85.2 | 82 | 98 |
| gas composition | | | |
| carbon monoxide vol % | 94.6 | 95.0 | 94.0 |
| carbon dioxide vol % | 1.8 | 1.3 | 2.5 |
| methane vol % | 0.2 | 0.2 | 0.7 |
| hydrogen vol % | 1.7 | 3.2 | 1.4 |
| dimethyl ether vol % | 1.6 | 0 | 1.4 |